US012764220B2

(12) United States Patent
Strzelczyk et al.

(10) Patent No.: US 12,764,220 B2
(45) Date of Patent: Oct. 13, 2026

(54) SYSTEM AND METHOD FOR ANONYMOUS COMMUNICATION WITH A VEHICLE SUBSCRIBER

(71) Applicant: South Pillar Capital LLC, Philadelphia, PA (US)

(72) Inventors: Paul Joseph Strzelczyk, Washington, DC (US); Jonathan Thomas Miles, Philadelphia, PA (US)

(73) Assignee: South Pillar Capital LLC, Philadelphia, PA (US)

( * ) Notice: Subject to any disclaimer, the term of this patent is extended or adjusted under 35 U.S.C. 154(b) by 243 days.

(21) Appl. No.: 18/891,604

(22) Filed: Sep. 20, 2024

(65) Prior Publication Data

US 2025/0016261 A1 Jan. 9, 2025

Related U.S. Application Data

(63) Continuation-in-part of application No. PCT/US2023/015670, filed on Mar. 20, 2023.

(Continued)

(51) Int. Cl.

*H04M 1/72412* (2021.01)
*B60L 53/65* (2019.01)

(Continued)

(52) U.S. Cl.

CPC ... *H04M 1/72412* (2021.01); *H04M 1/72418* (2021.01); *H04M 1/72433* (2021.01);

(Continued)

(58) Field of Classification Search

CPC ......... H04M 1/72412; H04M 1/72418; H04M 1/72433; H04M 1/72436; H04M 1/72439;

(Continued)

(56) References Cited

U.S. PATENT DOCUMENTS

2013/0197945 A1 8/2013 Anderson
2014/0046800 A1 2/2014 Chen (Continued)

FOREIGN PATENT DOCUMENTS

WO 2016-153444 A1 9/2016
WO 2017135944 A1 8/2017
WO 2019-212431 A1 11/2019

OTHER PUBLICATIONS

International Search Report for PCT/US2023/015670, issued Jun. 26, 2023 (3 pages).

(Continued)

*Primary Examiner* — Mazda Sabouri
(74) *Attorney, Agent, or Firm* — Devlin Law Firm LLC

(57) ABSTRACT

An anonymous system for communicating with a vehicle subscriber employs an interface device that is coupled with the vehicle. A third party, or communicator may want to communicate with the vehicle subscriber and use their mobile phone to interface with the system through the interface device. The communicator can then send a message, such as a text message, to the vehicle subscriber regarding their vehicle. The communicator's mobile device is linked with the system and a communication input is then opened on their mobile device. A message menu may allow the communicator to select a message for delivery to the vehicle subscriber. The communication from the communicator passes from the communicator's mobile device, through the system and then to the subscriber. An interface device may be a machine-readable code attached to the vehicle to allow a communicator's mobile device to scan the machine-readable code and be linked with the system.

27 Claims, 8 Drawing Sheets

Related U.S. Application Data

(60) Provisional application No. 63/323,135, filed on Mar. 24, 2022.

(51) Int. Cl.

| | |
|---|---|
| ***B60L 58/12*** | (2019.01) |
| ***G06K 7/14*** | (2006.01) |
| ***G06K 19/06*** | (2006.01) |
| ***H04M 1/72418*** | (2021.01) |
| ***H04M 1/72433*** | (2021.01) |
| ***H04M 1/72436*** | (2021.01) |
| ***H04M 1/72439*** | (2021.01) |

(52) U.S. Cl.
CPC ... *H04M 1/72436* (2021.01); *H04M 1/72439* (2021.01); *B60L 53/65* (2019.02); *B60L 58/12* (2019.02); *B60L 2250/16* (2013.01); *G06K 7/1417* (2013.01); *G06K 19/06037* (2013.01); *H04M 2250/52* (2013.01)

(58) Field of Classification Search
CPC .... H04M 2250/52; B60L 53/65; B60L 58/12; B60L 2250/16; G06K 7/1417; G06K 19/06037; H04W 4/021; H04W 4/40; H04W 12/02; H04W 4/80; H04L 67/12
See application file for complete search history.

(56) References Cited

U.S. PATENT DOCUMENTS

| | | | | |
|---|---|---|---|---|
| 2014/0142979 | A1 | 5/2014 | Mitsunaga | |
| 2014/0304053 | A1 | 10/2014 | Schwarz et al. | |
| 2015/0084745 | A1* | 3/2015 | Hertz | H04W 4/12 340/10.3 |
| 2015/0140932 | A1* | 5/2015 | Chien | H04W 76/11 455/41.2 |
| 2016/0239733 | A1* | 8/2016 | Hertz | H04W 4/029 |
| 2016/0241660 | A1* | 8/2016 | Nhu | H04W 4/80 |
| 2016/0267451 | A1 | 9/2016 | Eid | |
| 2016/0314329 | A1* | 10/2016 | Papazian | G06K 7/1417 |
| 2017/0134382 | A1 | 5/2017 | Darnell et al. | |
| 2018/0097985 | A1 | 4/2018 | Bradley et al. | |
| 2020/0092262 | A1 | 3/2020 | Zafaranchi et al. | |
| 2020/0193723 | A1 | 6/2020 | Huynh | |

OTHER PUBLICATIONS

Written Opinion for PCT/US2023/015670, issued Jun. 26, 2023 (20 pages).
International Preliminary Report on Patentability for PCT/US2023/015670, issued May 6, 2024 (24 pages).
Extended European Search Report for EP 23775516.0, issued Nov. 18, 2025 (18 pages).

* cited by examiner

SYSTEM AND METHOD FOR ANONYMOUS COMMUNICATION WITH A VEHICLE SUBSCRIBER

CROSS REFERENCE TO RELATED APPLICATIONS

This application is a continuation in part of international patent application No. PCT/US2023/015670 having an international filing date of Mar. 20, 2023, which claims the benefit or priority to U.S. provisional patent application No. 63/323,135, filed on Mar. 24, 2022; the entirety of all prior applications are hereby incorporated by reference.

BACKGROUND OF THE INVENTION

Field of the Invention

The invention relates to a system and method for anonymous communication with a vehicle subscriber to the system.

Background

There are often times when identification of a vehicle owner and communicating with the vehicle owner is desired, such as when a vehicle is preventing snow removal, or needs to be moved for road work or other purpose. Also, when there is an accident involving a parked vehicle, there is currently no way to contact the owner, thereby requiring handwritten notes to be left on the vehicle for communication after the accident.

SUMMARY OF THE INVENTION

The invention is directed to an anonymous system for communicating with a vehicle subscriber of the system, which may be owner or operator of the vehicle. The system employs an interface device that is coupled with the vehicle. A third party, or communicator as used herein, may want to communicate with the vehicle owner or vehicle operator, and use their mobile device, such as a mobile phone, to interface with the system through said interface device. The communicator can then send a message, such as a text message, to the vehicle owner regarding their vehicle. The communicator's mobile device is linked with the control system of the anonymous system for communicating with a vehicle subscriber and a communication input is then opened on their mobile device. A message menu may allow the communicator to select a message for delivery to the vehicle subscriber. The communication from the communicator passes from the communicator's mobile device, through the control system and then to the subscriber. All of the communication may be wireless communication, wherein the communicator's mobile device has a wireless signal transceiver and wherein the vehicle subscriber receives the message from the communicator on their mobile device through a wireless signal.

An interface device may include a machine-readable code that is attached to the vehicle and visible to allow a communicator's mobile device to scan or read the machine-readable code to be linked with the system. A sticker with a machine-readable code may be attached to the windshield, or other part of the vehicle for a communicator to interface with using the camera on their mobile phone. A machine-readable code may be a matrix barcode including a bar code or quick response (QR) code. A matrix barcode is a machine-readable label that links a communicator's mobile device with the system, such as with the website, an App and the like. An App, is an algorithm or computer program that is operated by the mobile device, such as a mobile phone.

In the event that the interface device can't be scanned, such as due to a window being dirty or the car being involved in an accident and the windshield being cracked, a code may be manually typed into the communicator's mobile device to be linked with the system. Also, a license tag of the subscriber's vehicle may be scanned or manually input into a communicator's mobile device to be linked with the system. For example, a vehicle that has been in an accident may be quickly interfaced with by a first responder by manually typing in the license tag identifier into the first responder's mobile device. The App may also enable a communicator to take a photograph of a license tag identifier to automatically interface the communicator with the system and enable sending a message to the vehicle subscriber. This license tag interface feature may only be an option for authorized subscribers, including police or emergency responders or may be an option for selection by the vehicle subscriber.

An interface device may comprise a wireless interface device, such as a Near Field Communication (NFC) device including but not limited to a radio-frequency identification (RFID) that uses electromagnetic fields to automatically link or interface a mobile device with the system. An RFID system utilizes a tiny radio transponder, a radio receiver and transmitter. A mobile device, such as a communicator's mobile device, can trigger the RFID with an electromagnetic interrogation pulse. The RFID can then transmit a digital signal to the communicator's mobile device to interface the communicator's mobile device with the system. A wireless interface device may also include a wireless interface device configured with the subscriber vehicle and may include a short range wireless signal, such as a Bluetooth signal, generated from the wireless interface device of the subscriber vehicle, wherein a communicator may interface with the anonymous system for communicating with a vehicle subscriber via said Bluetooth signal being linked to their communicator device.

An interface device may comprise a Near Field Communication (NFC) device that enables a mobile device to recognize the NFC and interface with the system. An NFC device utilizes a small microchip that can be read by mobile devices that are in range. A communicator may have to set their mobile phone to a discovery mode to find and sync with an NFC device of a vehicle.

An interface device may be purchased and coupled to the vehicle by the owner of the vehicle or may be part of the vehicle as manufactured. An existing interface device may be registered with the system for use with enabling communication by third parties to the vehicle owner through the system.

A communicator may use a mobile device, such as a mobile phone, tablet computer, watch, or any other suitable mobile device to interface with the system. In the case of a mobile phone having a camera, the camera may be used to scan machine-readable code to interface with the system. Also, a mobile phone may sync with the system using an RFID or NFC device coupled with the vehicle. Upon successful interfacing with the system, a communication input may be opened on the communicator's mobile device to enable them to provide a message to the vehicle owner. A mobile App may be opened on their mobile device to enable the communicator to input a message. The mobile App may display a message menu having a plurality of message types for the communicator to select. A series of menus may result in specific messages for the communicator to select.

A communicator may send a message to a vehicle subscriber through the communicator mobile device, such as text message, a voice message and/or a photo-message that includes a digital photograph or a video. A text message as used herein refers to a message that includes text and symbols that a subscriber and/or communicator read from their respective mobile devices. A text message herein is not a direct SMS text message as all messages are routed through the control system and are not direct communicator to subscriber messages from their respective mobile devices. A text message may be a XMPP type text message, or more broadly, a text message from an independent messaging communication system that uses internet communication for sending and receiving messages between mobile devices. The communicator may also communicate via live phone messaging wherein the communicator speaks in real time with the vehicle subscriber. The communication may go through the control system of the system however.

For example, a communicator may have backed into a vehicle and may send a text message to the vehicle owner with their contact information and a photo-message with a picture showing the damage to the vehicle. A photo-message is a message including a digital photograph or a video. A vehicle subscriber may receive the message from the communicator on their electronic device, such as a mobile device and then respond. Communication between the communicator and vehicle subscriber may be anonymous, wherein the phone numbers, names and other contact information is not provided to either party. As mentioned above however, a communicator and/or vehicle subscriber may choose to provide contact information for the purposes of future direct communication. The system may also enable a direct phone call between the two parties and this feature may only be enabled if approved by the vehicle subscriber. An authorized subscriber, such as police or first responders, may have their identity or affiliation provided when a communication is delivered from them to a vehicle subscriber. The system may enable a vehicle subscriber to optionally provide contact information to a communicator.

The anonymous system for communicating with a vehicle subscriber may take measures to prevent unwanted or unsolicited communication. For example, the communicator may have to accept terms of using the system, such as by accepting terms before downloading a mobile App. The mobile App may use a global positioning system (GPS) to track a location of the communicator's mobile device and the system may check to verify that the communicator is within a proximity distance of the subscriber's vehicle to allow communication from the communicator to the subscriber. A communicator may be provided an option to subscribe when interfacing with an interface device of a subscriber vehicle. A communicator may be a vehicle subscriber or simply a subscribed communicator without an associated vehicle.

The anonymous system for communicating with a vehicle subscriber may enable different levels of communication by authorized communicators. For example, an authorized communicator may be identified to the vehicle subscriber when receiving a message from an authorized communicator. An authorized communicator may be pre-registered with the system to allow rapid communication with one or more vehicle subscribers. Also, the anonymous system for communicating with a vehicle subscriber may utilize GPS to determine the location of a vehicle subscriber's vehicle. The GPS may be determined through the interface device or through some auxiliary GPS device located on the vehicle. Most new vehicles have GPS configured in the vehicle, or a factory installed GPS in the vehicle.

An authorized communicator may include governmental organizations, such as police, fire department, first responders, EMTs, public works, and the like. For example, a public works authorized communicator may require a person to move their vehicle for the purpose of repairing a water line. The public works authorized communicator may interface with each vehicle subscriber having a vehicle that is required to be moved or may interface with the system and request a message to be sent to any vehicles in a particular area or on a street for example. The system may determine which vehicles registered with the system are in the prescribed area or parked on the identified street and may send them the message from the public works authorized communicator. In another example, a public works authorized communicator may have work scheduled on a street and may request that a message be sent to all vehicle subscribers having vehicles parked on the street regarding the upcoming work and to move their vehicle before a required time. The system may also alert any new vehicle subscribers having vehicles that park on the street of the message from the public work authorized communicator. In this way, the street will hopefully be free of parked vehicles when the public work is to begin. The public works authorized communicator may interface with the system to identify the street or area, dates and time frames for the message and the message details.

An authorized communicator may be a parking authority or a police department and may be a message informing the vehicle subscriber of invalid parking. The message may request that they move the vehicle within a certain period of time or may include a citation notification making reference to an issued citation, and relevant fine or official warning for invalid parking and fine for invalid parking. A vehicle subscriber may pay the fine directly through the system and the fine may be reduced if paid through the system within a required timeframe. The administrative cost to send out parking tickets and to process payment is high and a discount on the fine may incentivize the vehicle subscriber to pay through the system. It should be noted that the system can also be used to communicate moving violations to the vehicle subscriber and the fine can be paid through the system as detailed above.

In another example, a police officer, acting as authorized communicator, may initiate communication with a vehicle subscriber during a traffic stop, enabling a police officer to communicate with the driver or vehicle owner before they exit their own vehicle to execute the traffic stop; giving a police officer more information to analyze the situation and increase the safety and security of both the officer and the occupants of the vehicle.

An authorized communicator may be a department of motor vehicles (DMV) and the message may relate to registration of the vehicle. The vehicle subscriber may pay for registration through the system and have their new registration sent to them in the mail. This streamlines the process and helps the DMV ensure they are collecting registration fees in an efficient manner.

An authorized communicator may include a towing company or official towing authority and the message may include the location and contact information of the towing company and therefore location of the vehicle subscriber's towed vehicle. The message may also enable payment for towing and releasing the vehicle from the impound lot.

An authorized communicator may include an organization communicator, such as a business including a parking business that enables payment for parking through the system. Also, the interface device may enable gates to open to the parking lot and may record the date and time of entry and departure for billing purposes.

The anonymous system for communicating with a vehicle subscriber may store information about the vehicle subscriber's vehicle such as make, year and model, and type of vehicle, such as electric vehicle, hybrid or combustion engine vehicle. The vehicle subscriber may also input that the subscribed vehicle is authorized to park in handicap parking spots. This information may be useful for third party communicators, which may be authorized communicators to send messages to vehicle subscribers having specific types of vehicles. For example, a vehicle manufacturer may have a recall and may use the system to send a message regarding the recall to all vehicle subscribers having a vehicle that is part of the recall.

An authorized communicator may be associated with an electric vehicle charging station or system or may be associated with a business having an electric vehicle charging station on their premises, and these authorized communicators may send messages to vehicle subscribers that are park at an electric vehicle charger including messages that their subscribed vehicle is completed charging and/or to move their vehicle. Also, these authorized communicators may send messages to a vehicle subscriber to move their vehicle when their subscribed vehicle is not an electric vehicle or plug in hybrid and is parked at an electric vehicle charger. The messages may be automatic and be sent from the electric vehicle charging station system or business owner when geolocation determines through geolocation that the subscribed vehicle is parked at an electric vehicle charger. Likewise, the anonymous system for communicating with a vehicle subscriber may send messages to vehicle subscribers when they are parked in a handicap parking spot and they have not included that their vehicle has a handicap parking authorization. Again, this messaging may be automatic and may use geolocation and a geotag of the subscribed vehicle.

The anonymous system for communicating with a vehicle subscriber may also allow other third-party communicators to communicate with vehicle subscribers. A vehicle subscriber may be registered with the system and the system may be free to the vehicle subscriber or provided at a reduced cost if they allow communication from third party communicators. A third-party communicator may be a vehicle insurance company that sends a message regarding an insurance promotion. Also, a local business, such as a restaurant may be a third-party communicator that uses the system to send proximity messages, or message to the vehicle subscribers having vehicles located within a certain proximity to the restaurant, such as within 10 miles. Note that the proximity distance may be 100 miles or less, 50 miles or less, 25 miles or less, 10 miles or less, 5 miles or less or even 1 mile or less and any range between and including the proximity distances provided.

The system may store information about the vehicle subscriber, such as gender, age, residence, medical conditions and the like and the third-party communicator may send messages to a particular subset of the subscribers that fall into a demographic criterion, such as age and location. The message may be regarding life insurance, for example.

The anonymous system for communicating with a vehicle subscriber may enable the vehicle subscriber to submit an outgoing message, a message that a communicator may receive when they interface with the vehicle interface device. For example, a vehicle may run out of gas and instead of putting a shirt in the window or providing other notifications, a vehicle subscriber may submit an outgoing message that states, "Out of gas, will be back to move vehicle by 2:30 pm." A police officer may come upon the abandoned vehicle and then learn the situation via interfacing with the system. Also, a vehicle subscriber may submit a message that their vehicle has been stolen and a police officer may have their mobile device in interface mode when patrolling to locate stolen vehicles.

An outgoing message may be a message regarding the status or location of the vehicle subscriber. For example, a vehicle subscriber may be heading out on a two day backpacking trip and may provide details of the route and expected time of return as well as emergency contact information. This message may be scheduled to be provided to communicators after their scheduled return, unless the communicator is an authorized communicator. Also, a vehicle subscriber may designate if the outgoing message can be seen by the public or only authorized communicators. A park officer may interface with the interface device of the vehicle and see the message as they are an authorized communicator and they may note that the car should be moved in a few days. A public communicator may interface with the interface device prior to the date of posting of the vehicle subscriber's outgoing message and they may be allowed to see the outgoing message.

An outgoing message may be a message regarding details of the vehicle, such as make, model, year, size of engine, etc. The vehicle may be parked at a car show, for example, and attendees of the car show may interface with the vehicle through the interface device to find out more about it. The outgoing message might state, "Historic Buick, 1945 model, restored by John Smith in 2018."

An outgoing message may include medical information about the vehicle subscriber or likely passengers in the vehicle. This type of outgoing message may be designated by the vehicle subscriber to be sent to authorized communicators. In the event of an accident, the emergency responders may interface with the interface device of the vehicle to learn the name, gender and age of likely passengers and any medical conditions. A vehicle subscriber or a passenger in the vehicle with a heart condition may require different treatment from the emergency responders than other passengers. In addition, the outgoing message may include emergency contact information, wherein the emergency responders can then quickly get in touch with the specified contact to inform them of the accident and location of the vehicle subscriber.

The anonymous system for communicating with a vehicle subscriber may be used for any type of vehicle including an automobile, such as a car, truck, bus, personal vehicles, fleet vehicles, motorcycles and the like. Also, the anonymous system for communicating with a vehicle subscriber may be used with other types of vehicles including, but not limited to aircraft, airplanes, helicopters, and the like. In the case of aircraft, the communication may be regarding hanger occupancy or availability. The anonymous system for communicating with a vehicle subscriber may also be used with watercraft including, but not limited to, boats, sailboats, jet skis, human powered watercraft such as kayaks and canoes, and ships. In the case of watercraft, communication may include communication regarding slip occupancy or availability. An anonymous system for communicating with a vehicle subscriber may be used for a bicycle, including an electric bicycle, a bicycle powered at least in part by an electric motor.

The anonymous system for communicating with a vehicle subscriber may enable vehicle subscribers to communicate with each other. The system may enable vehicle subscribers to allow or authorize various types or levels of communication. The vehicle subscriber may join or allow communication from specific groups including groups determined by the type of vehicle. In this way, vehicle subscribers with a particular type of vehicle may share tips or issues they may have with the vehicle. Also, a vehicle subscriber may designate that they are open to selling their vehicle and thereby allow communication from other vehicle subscribers and third-party communicators regarding the purchase of the vehicle. A vehicle subscriber may send a message to all Ford Bronco vehicle subscribers that they are looking to purchase a red Bronco with less than 50K miles.

The anonymous system for communicating with a vehicle subscriber may be configured to allow vehicle subscribers to track their maintenance schedule. Scheduled maintenance records can be documented to provide reference and reminders for future maintenance. Third party communicators could send users a digital receipt through the system with a description of services so that it can be included in the vehicle history. Vehicle subscribers could then set reminders for relevant action based on milestones such as dates, mileage or be prompted by third party communicators to take action. Detailed records can help diagnose future issues and alert users to needed upgrades or repairs. In addition, vehicle subscribers may use the system to track the history of service and repairs on their vehicle and to track upgrades and service to components of the vehicle. Having digital records about the life of parts can assist in making decisions about future upgrades, replacements or compatibility with new parts.

The history of the vehicle may be provided to other vehicle subscribers and third parties for the purpose of selling the vehicle or obtaining insurance for the vehicle. An insurance company can better adjust rates or offer better coverage to a vehicle subscriber that has a detailed service history. A secondary market purchaser can find value in knowing the detailed and verified history of a vehicle which may generate more value for a seller and greater comfort to a new owner.

The anonymous system for communicating with a vehicle subscriber may allow a vehicle subscriber to register details of the vehicle and components or parts of the vehicle. In the event that a registered vehicle or related component are ever stolen or misplaced, the system can assist in the recovery of those items. The vehicle subscriber may list their vehicle and relevant components as stolen or missing in the system. By cataloging the various components and including unique identification codes, such as serial numbers, third parties can use the system to identify and return items to the registered vehicle subscriber or owner. This cataloging of components can assist in decreasing vehicle theft as the market for stolen parts would be hindered by the ability of buyers to independently verify that a part was stolen.

A vehicle subscriber may transfer the communication details from themselves to another person. For example, a vehicle subscriber may have other family members or friends that use the vehicle and when the vehicle is being used by another person, the vehicle subscriber may change the contact information. In this way, if the vehicle subscriber's daughter is using the vehicle and is parked in a no-parking zone, the notification to move the vehicle will also be delivered to her mobile device, thereby enabling her to quickly move the vehicle. Likewise, a rental car company may transfer contact information over to each driver that rents the vehicle. This way, any tickets are paid directly by the driver and avoids costly administrative work on the rental car companies end.

The anonymous system for communicating with a vehicle subscriber may use a GPS location of the vehicle as determined by a factory installed GPS in the vehicle, or a GPS location as determined by an interface device including a GPS system that is installed or coupled with the vehicle. As described herein, communication between a communicator and a vehicle subscriber may only be allowed if the communicator is within a proximity distance of the vehicle location. This input of the vehicle location may be used for determining the proximity distance of the communicator. The communicator in this case, may not be required to scan or otherwise interface with an interface device on the vehicle. They may open the website or system App and input a message that would be sent to the vehicle subscriber if the communicator is within a proximity distance to the vehicle subscriber's vehicle, such as within about 10 ft or less, or even 5 ft or less. This digital tag or pinned location of the vehicle is just a virtual representation of the machine readable tag located on the vehicle. The communicator may be required to verify the make and/or model of the vehicle to enable the communication with the vehicle subscriber. The system may request an input of the make a model from the communicator via an input field or a selection field. All information would still be anonymous between the communicator and the vehicle subscriber. An authorized communicator may open the website and/or mobile App and see all vehicles of the system identified on a map. The authorized communicator may then send a message to all vehicle subscribers in a designated area or proximity from the communicator's location. Vehicle subscribers may be able to set the access control to determine who could view their digital tag, other users, Authorized Users, or other relevant third parties.

The anonymous system for communicating with a vehicle subscriber may enable a vehicle subscriber to input a location of their vehicle by interfacing with the system and inputting the location. A map may be opened, and the vehicle subscriber may touch the screen or otherwise input a location of the vehicle. This may be used in cases where a subscribed vehicle does not have a geotag. The system may verify this location by geolocation confirmation of the vehicle subscriber's mobile device.

EXAMPLES

A vehicle subscriber parks their vehicle at a given location and opens the system App on their mobile device. They upload location information that indicates exactly where their vehicle is parked. Much like dropping a pin on a digital map. The pin represents an exact geolocation. For the vehicle subscriber, this pin is their Digital Tag. If their car has a GPS device and is capable of automatically transmitting the geolocation data, the vehicle subscriber could set the vehicle to do this automatically when they park.

A communicator, also a system user, approaches the vehicle subscriber's vehicle and needs to communicate with the parked vehicle owner, they open up the system App and input their own geolocation to the system. Any vehicle registered with the system that is parked in proximity to the communicator would be viewable on a digital map, assuming the vehicle subscriber had given permission to be visible on the map. The communicator then selects the vehicle based upon a simple description and engages in the standard system communication features. This communication scenario would only be relevant for parked vehicles, another driver could not pull up next to a moving vehicle of the system and access the Digital Tag.

In the same example of a vehicle subscriber indicating their vehicle's location through a Digital tag, an authorized User could open up the digital map in the system application and see all of the vehicles parked in a particular area or street. This data would be anonymous and the authorized user would only have access to send a standard message without any indication of the identity of users. The authorized user could then select some or all of those vehicles to transmit a message to each of the individual vehicle subscribers having vehicles parked within the designated area. This type of communication between an authorized user and vehicles within a designated area may be to announce a road closure or emergency work needing to be completed. The authorized user could alert those vehicles in the service area without needing to be anywhere near the actual site of reference.

All driver information would still be anonymous. All driver location information would be hidden until either matched with the geolocation of another user or by an authorized user access. This is not a feature that could be used to track vehicles or disclose any information not allowed by the user.

The control system may including a computer or computing device that processes non-transitory computer readable medium to operate the anonymous communication system as described herein and may include a system App that operates on user's mobile devices including vehicle subscribers and communicators. The control system may interface with a database and receive input wirelessly from user's mobile devices and may send instructions and messages wirelessly to user's of the system, vehicle subscribes and communicators. The control system may include a geolocation system that is used to determine a location of the subscriber vehicle via a geotag that is located in the subscriber vehicle and/or to determine a location of the communicator mobile device. A geotag may enable determination of a location of a subscriber vehicle and/or communicator mobile device within about 5 m or less, or even 3 m or less or the actual physical location. A geolocation system may utilize satellites and/or cell towers to determine a location of either the subscriber vehicle and/or the communicator mobile device.

As described herein, the control system may determine a proximity communicator distance when the communicator reads the matrix barcode attached to said subscriber vehicle and/or when the communicator sends a communicator message to the control system. The control system may determine if the communicator mobile device is within a proximity communicator distance from said subscriber vehicle before the communicator message is sent to the vehicle subscriber. This may prevent communicator messages from being sent after the communicator has moved outside of the proximity communicator distance. The proximity communicator distance may be about 30 m or less, about 20 m or less, about 10 m or less and any range between and including the distances provided.

Also, as described herein, the control system may determine the location of subscribed vehicles to enable an authorized communicator, such as a government agency to send a communicator message to all subscribed vehicles within a geographical region. The geotag of a subscriber vehicle may enable tracking of a subscriber vehicle through the geolocation system. A geographical region may be any subscriber vehicle within a radius from a specific location or may be all vehicles with a boundary such as a county boundary, or city limits boundary, or zip code boundary, or configured on one or more streets, or neighborhoods, and the like. An authorized communicator may input or select the geographical region, or specific location and radius for an authorized message. For example, a train may be derailed, and an authorized communicator may select the location of the train derailment as the specific location and then select a radius of two miles to send an emergency message regarding the derailment and actions to take as a result of the derailment.

The summary of the invention is provided as a general introduction to some of the embodiments of the invention and is not intended to be limiting. Additional example embodiments including variations and alternative configuration of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
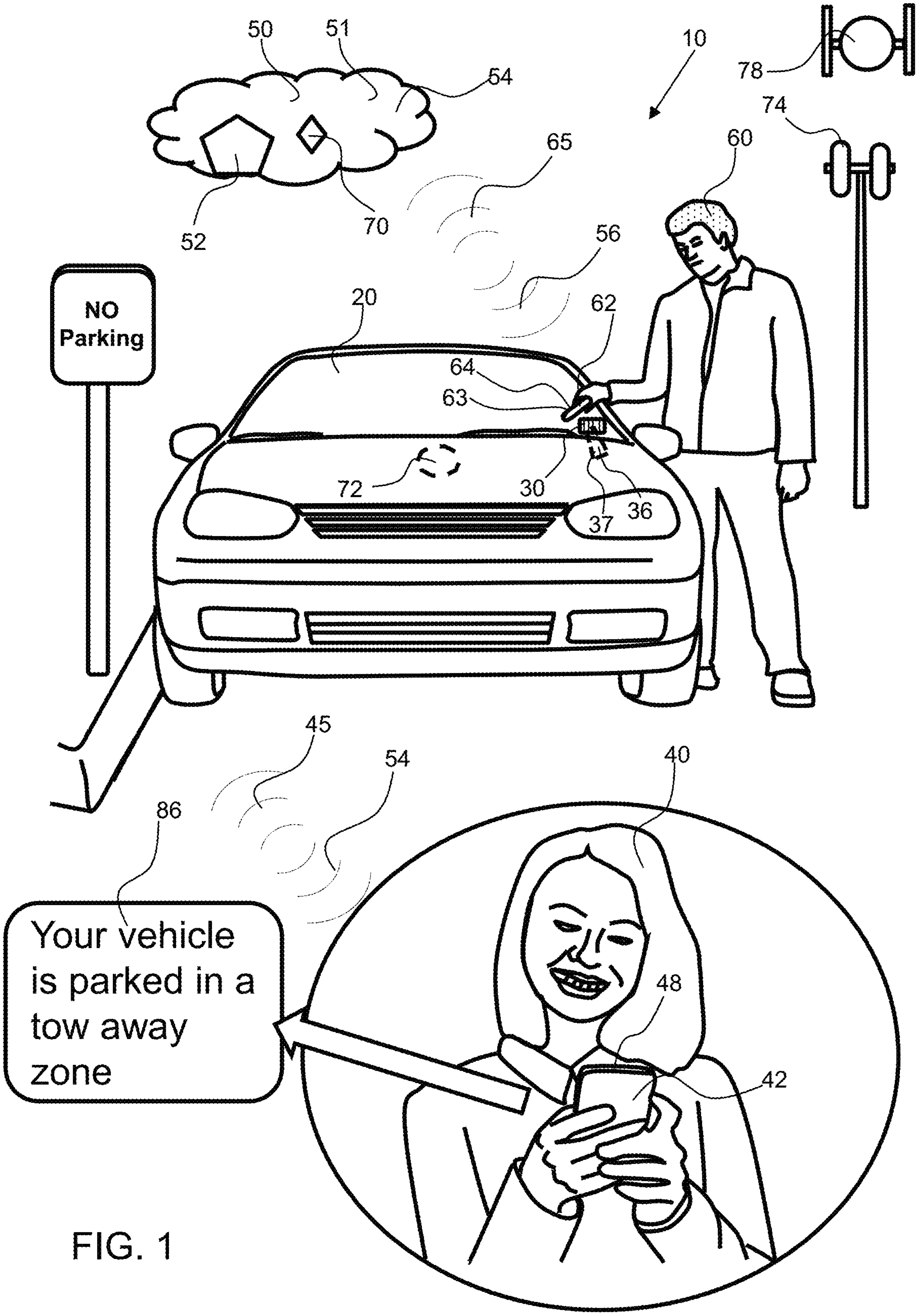
FIG. 1 shows a front view of an anonymous system for communicating with a vehicle subscriber.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an anonymous system for communicating with a vehicle subscriber 10 utilizes a vehicle interface device 30 that interfaces a communicator interface device 63 with the control system 50 to enable the communicator 60 to anonymously communicate with the vehicle subscriber 40. As shown, the communicator 60 is holding their mobile device 62 proximal to the vehicle 20 and over the vehicle interface device 30. Upon interfacing the communicator's mobile device with the control system 50, the communicator can then send a communicator message 86 anonymously to the subscriber mobile device 42 of the vehicle subscriber 40, which may be the owner of the vehicle. As shown, the communicator noticed that the vehicle 20 was parked in a no parking zone and interfaced their communicator mobile device 62 with the control system 50 using the vehicle interface device 30 and then subsequently sent the communicator message 86, a text message, "Your vehicle is parked in a tow away zone." The communicator message 86 was sent via a wireless signal 65 to the control system 50 and the control system subsequently sent the communicator message 86 via a wireless signal 54 to the subscriber mobile device 42. The vehicle subscriber 40 may then send a response message using the subscriber user input 48 of the subscriber mobile device 42 that is sent via a wireless signal 45 to the control system 50 and subsequently to the communicator mobile device 62 via wireless signal 56. In this way, the communicator and the vehicle subscriber can communicate anonymously. The control system includes a controller 52, such as a computing device configured to run an operating computer program and a database to store information regarding vehicle subscribers and/or vehicles of a vehicle subscriber. The control system 50 may utilize a database 51 to store required information for making connections between subscribers and other subscribers or communicators.

A wireless interface device 36, such as a Near Field Communication device 37 that may interface with the interface device 62 of the communicator mobile device 62, such as the wireless communication device 64. Near Field Communication (NFC) is a set of short-range wireless technologies, typically requiring a distance of 10 cm or less, 8 cm or less, 6 cm or less or even 4 cm or less to initiate a connection between a wireless device, a communicator mobile device and the Near Field Communication device.

The control system 50 may include a geolocation system 70 that is used to determine a location of the subscriber vehicle 20 via a geotag 72 that is located in the subscriber vehicle and/or to determine a location of the communicator mobile device 62. A geolocation system may utilize satellites 78 and/or cell towers 74 to determine a location of either the subscriber vehicle and/or the communicator mobile device.

As described herein, the control system may determine a proximity communicator distance when the communicator reads the matrix barcode attached to said subscriber vehicle and/or when the communicator sends a communicator message to the control system. The control system may determine if the communicator mobile device is within a proximity communicator distance from said subscriber vehicle before the communicator message is sent to the vehicle subscriber. This may prevent communicator messages from being sent after the communicator has moved outside of the proximity communicator distance.

Figure 8:
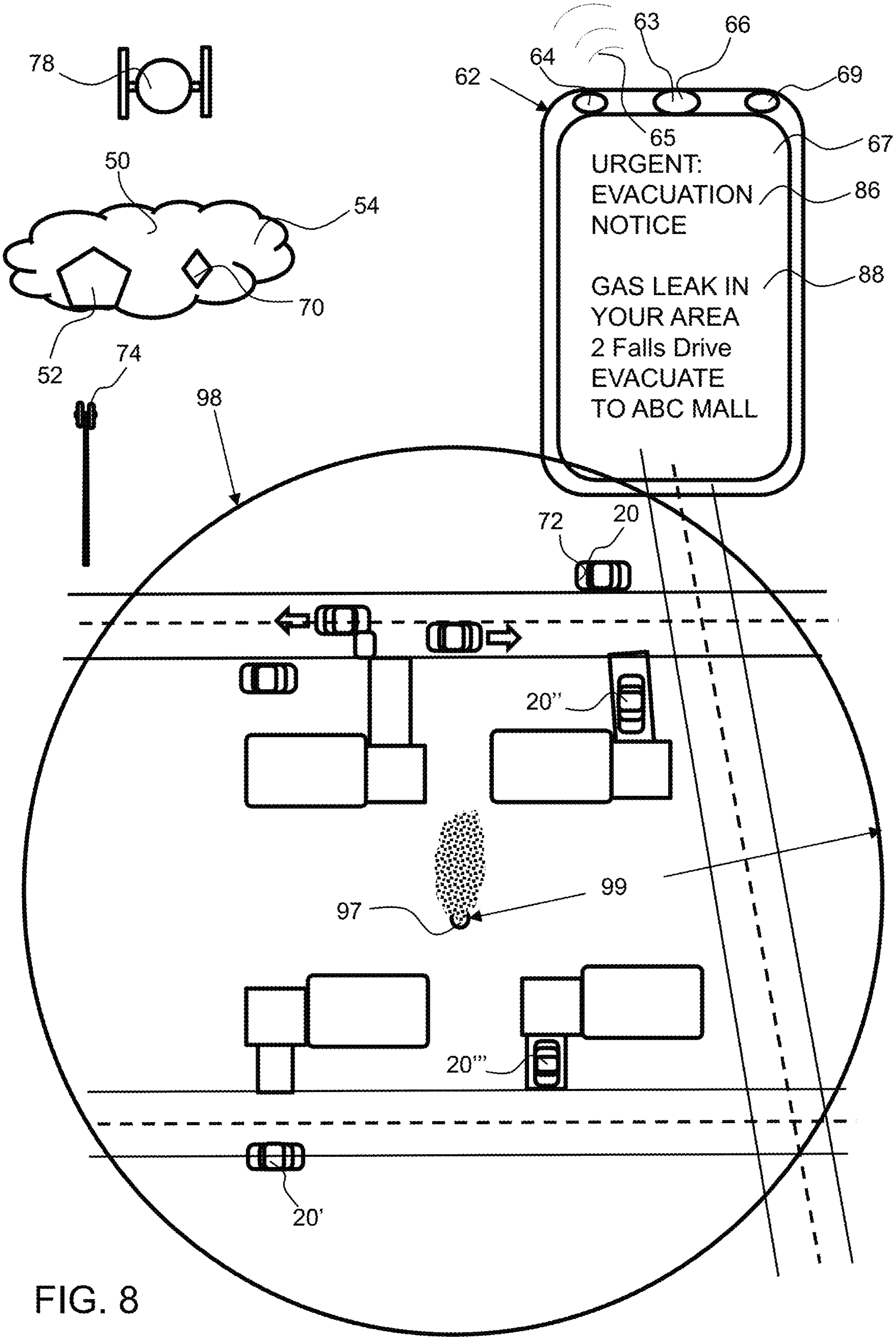
FIG. 8 shows an aerial view of geographical region within which an authorized communicator has used a communicator device to send an authorized communicator message to all vehicle subscriber having a subscriber vehicle within said geographical region.

Also, as described herein, the control system may determine the location of subscribed vehicles to enable an authorized communicator, such as a government agency to send a communicator message to all subscribed vehicles within a geographical region, as shown in FIG. 8. The geotag 72 of a subscriber vehicle 20 may enable tracking of a subscriber vehicle through the geolocation system 70.

Also shown in FIG. 1, is a wireless interface device 36, such as a near field communication device 37 that may interface with the interface device 62 of the communicator mobile device 62, such as the wireless communication device 64.

Figure 2:
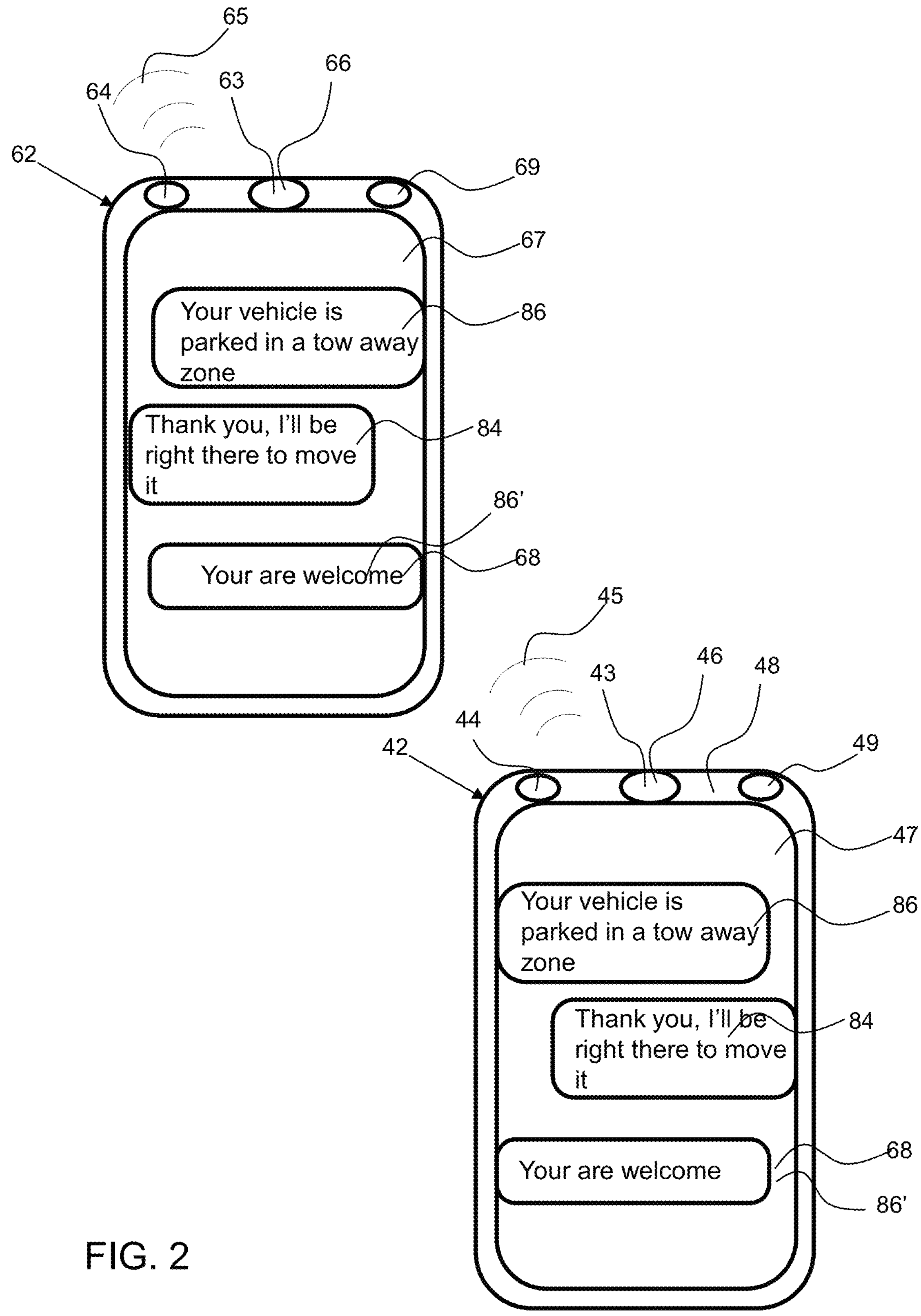
FIG. 2 shows a communicator mobile device and a subscriber mobile device.

As shown in FIG. 2, a communicator mobile device 62 and a subscriber mobile device 42 are configured to communicate anonymously. The communicator mobile device 62 may have a communicator interface device 63 that may include a camera 66 for taking a photograph or scanning a vehicle interface device, such as a machine-readable code. The communicator mobile device 62 has a wireless communication device 64 that is configured to send a wireless signal 65. The communicator mobile device 62 has a communicator user input 68 such as a touch screen display 67, to type in a text message and a microphone 69 to provide a verbal message and also a subscriber interface device 43, such as a camera 46. As shown, the communicator has typed in a communicator message 86 that was sent to the subscriber mobile device 42 and the subscriber has typed in a subscriber message 84 in response to the communicator's message. The communicator subsequently sends a response "You are welcome" text message back to the subscriber's mobile device. The subscriber mobile device 42, such as a mobile phone, as shown, also has a wireless communication device 44 that is configured to send a wireless signal 45. The subscriber mobile device 42 has a subscriber user input 48 such as a touch display screen to type in a text message and a microphone 49 to provide a verbal message.

Figure 3:
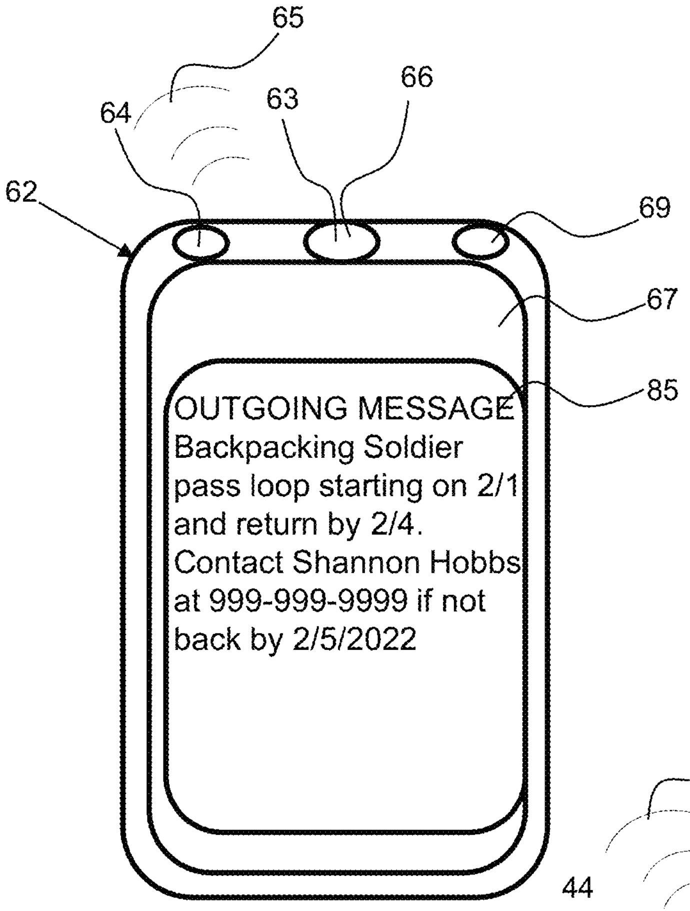
FIG. 3 shows an outgoing message from a vehicle subscriber on a communicator's mobile device regarding a backpacking trip and expected return date and time.

FIG. 3 shows an outgoing message 85 from a vehicle subscriber on a communicator's mobile device 62 regarding a backpacking trip and expected return date and time. The park authority may make a note of the expected return date and check to make sure the backpackers returned safely.

Figure 4:
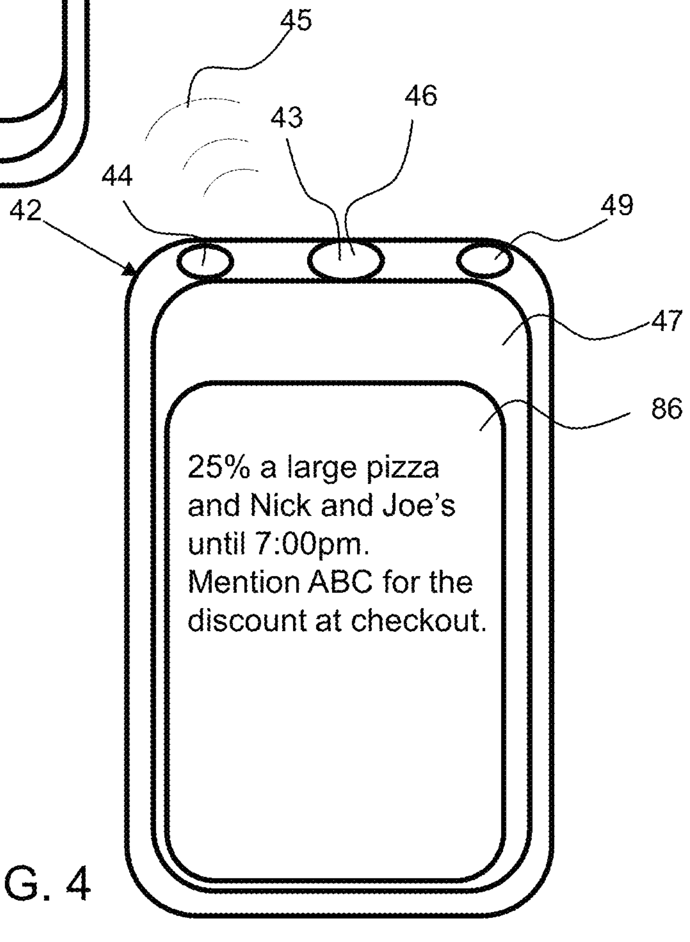
FIG. 4 shows an incoming message from a third-party communicator regarding a promotion on pizza.

FIG. 4 shows an incoming communicator message 86 from a third-party communicator regarding a promotion on pizza. This is an example of a promotional message and also a proximity message as it may be only sent to vehicle subscribers with vehicles within a proximity range.

Figure 5:
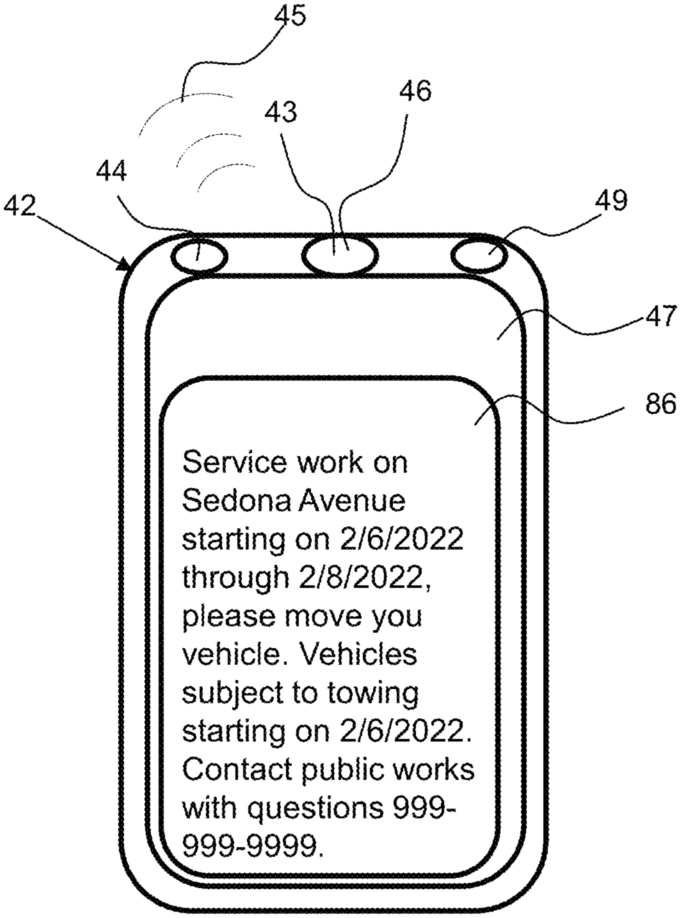
FIG. 5 shows an incoming proximity message from an authorized communicator to a vehicle subscriber's mobile device with details of a road closure and request that the vehicle subscriber's vehicle be moved.

FIG. 5 shows an incoming proximity communicator message 86 from an authorized communicator to a vehicle subscriber's mobile device 42 with details of a road closure and request that the vehicle subscriber's vehicle be moved. As described herein, the authorized communicator may submit the message request through the system, such as on a website of the system to send this message to any vehicles on this street or that park on this street for a selected duration, such as from Feb. 1, 2022 until Feb. 6, 2022.

Figure 6:
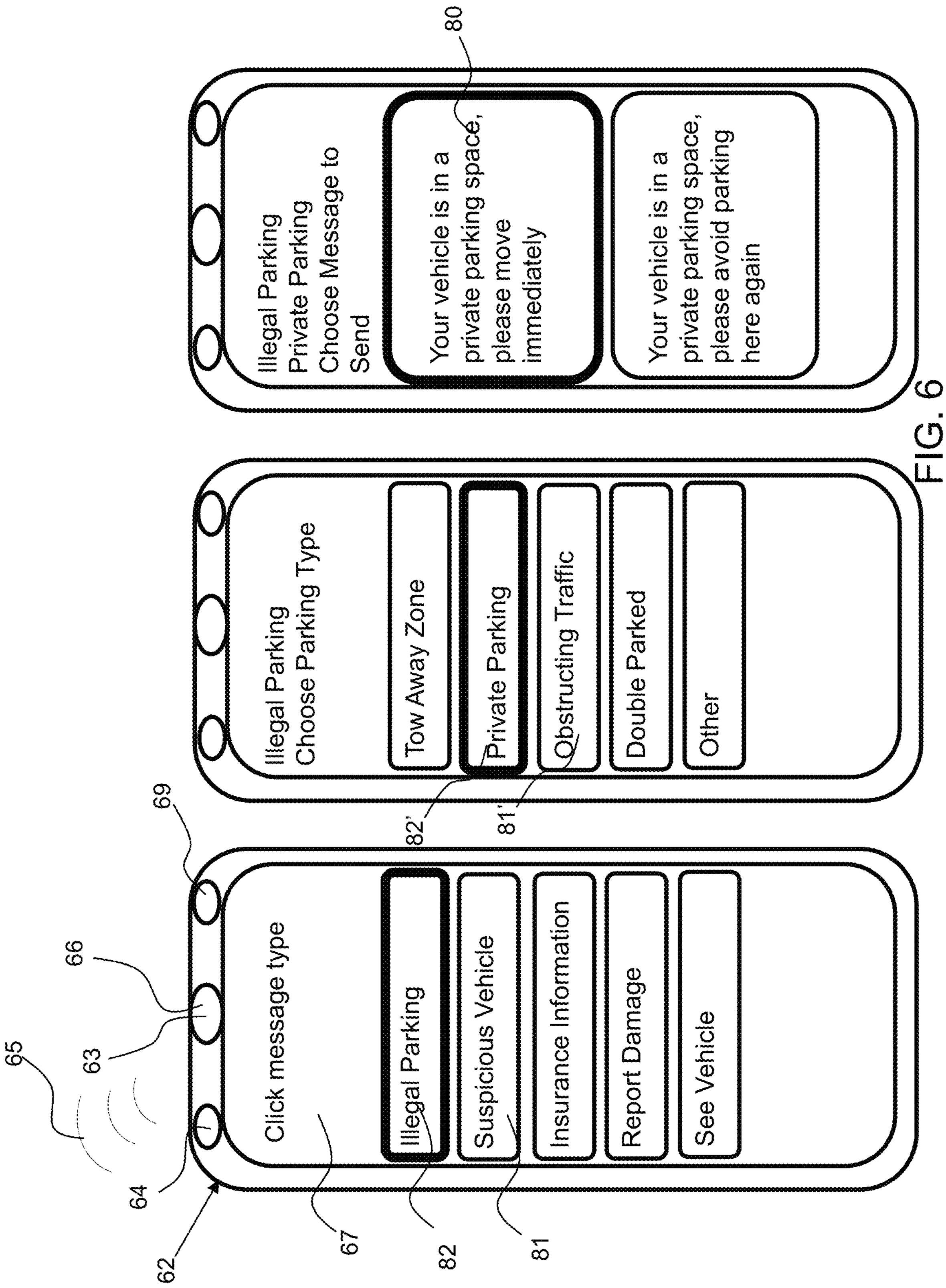
FIG. 6 shows a communicator mobile device having message menus for selecting a message type.

As shown in FIG. 6 an anonymous system for communicating with a vehicle subscriber 10 may provide a message menu 81 on the display 67 of a communicator's mobile device 62 having a plurality of message types 82. The menu may change after a first message type 82 selection and a second message menu 81' may provide additional selections of message types 82'. The communicator may then select a particular message 80 from a plurality of message options. This message menu may facilitate communication and help with clarity of the message sent to a vehicle subscriber.

Figure 7:
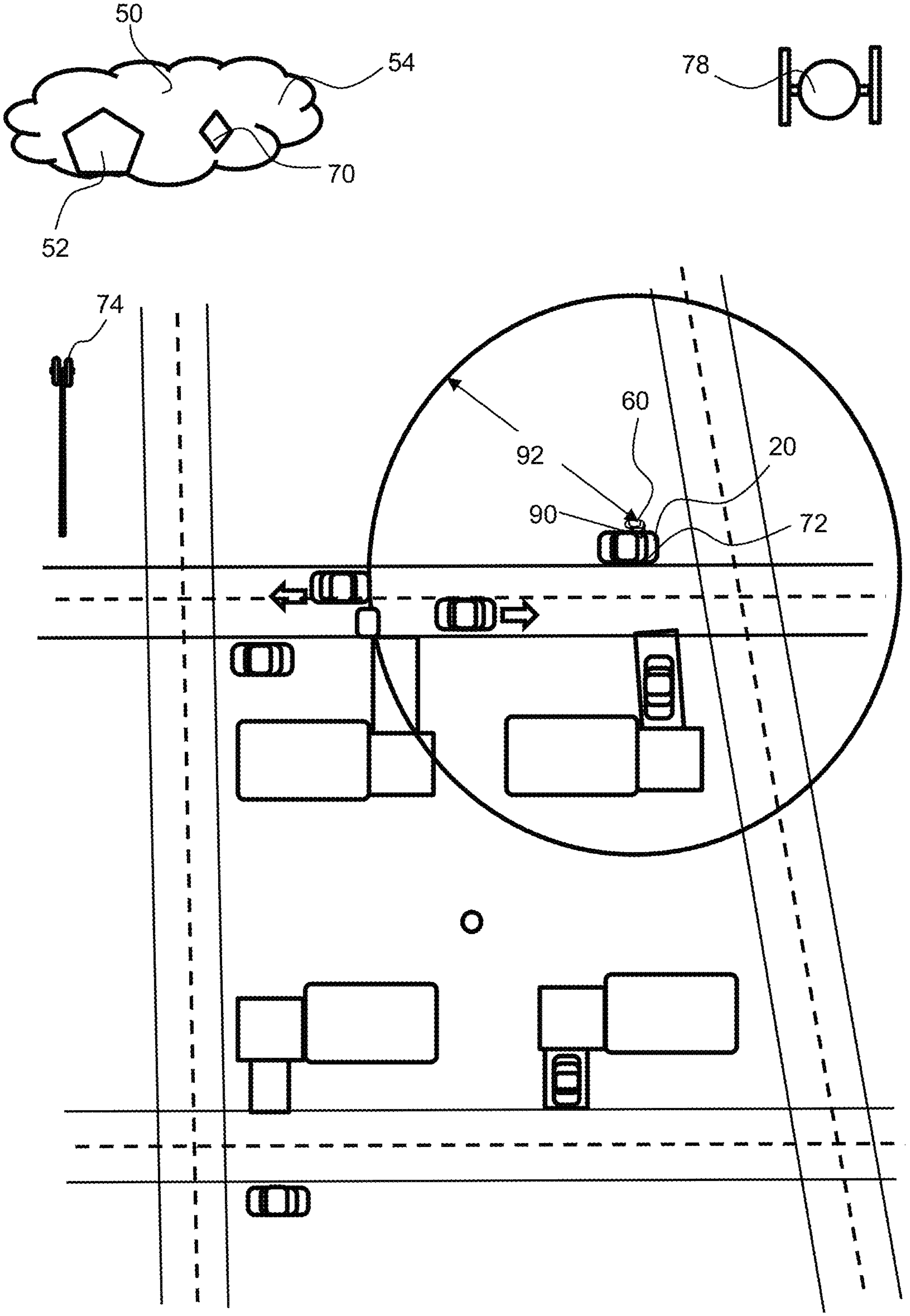
FIG. 7 shows an aerial view of a communicator within a communicator distance of a subscriber vehicle using their communicator mobile device to read the vehicle interface device and a proximity distance as determined by the geolocation system within which the communicator may communicate with said subscriber.

As shown in FIG. 7 and with reference to FIG. 1, a communicator 60 is standing next to a subscriber vehicle 20 and is using their communicator mobile device 62 to read the vehicle interface device 30. The geolocation system has determined a proximity communicator distance 90, the distance of the communicator mobile device 62 from the subscriber vehicle 20, and the communicator distance 90 is within the threshold proximity communicator distance 92 as indicated by the circle around the subscriber vehicle. Therefore, the control system will send a communicator message to a vehicle subscriber. The system may enable communication from the communicator to the vehicle subscriber when the reading of the vehicle interface device was within this threshold proximity communicator distance, even after the communicator has moved outside of this threshold proximity communicator distance. This may enable a communication about an issue to take place between the communicator and the vehicle subscriber as the communicator continues on their way outside of the threshold proximity communicator distance.

As described herein the control system 50 may include a geolocation system 70 that is used to determine a location of the subscriber vehicle 20 via a geotag 72 that is located in the subscriber vehicle and/or to determine a location of the communicator mobile device 62. A geolocation system may utilize satellites 78 and/or cell towers 74 to determine a location of either the subscriber vehicle and/or communicator.

As shown in FIG. 8, an authorized communicator has used a communicator device mobile device 62 to send an authorized communicator message 88 to all vehicle subscriber having a subscriber vehicle within a geographical region 98, or geographical region threshold distance 99 from a specified location 97, a gas leak location as shown. The vehicle subscribers will receive the authorized communicator message 88 on their subscriber mobile device. The authorized communicator may interface with the control system to set a geographic region or geographical region threshold distance and a specified location 97. A geographic region may be set by a zip code or other boundary such as county or city boundaries and may not be circular as shown. The communicator message 86, the authorized communicator message may be received by all subscribed vehicles 20, 20', 20'', 20'', within the geographical region 98, even vehicles that are traveling through the geographical region.

Figure 9:
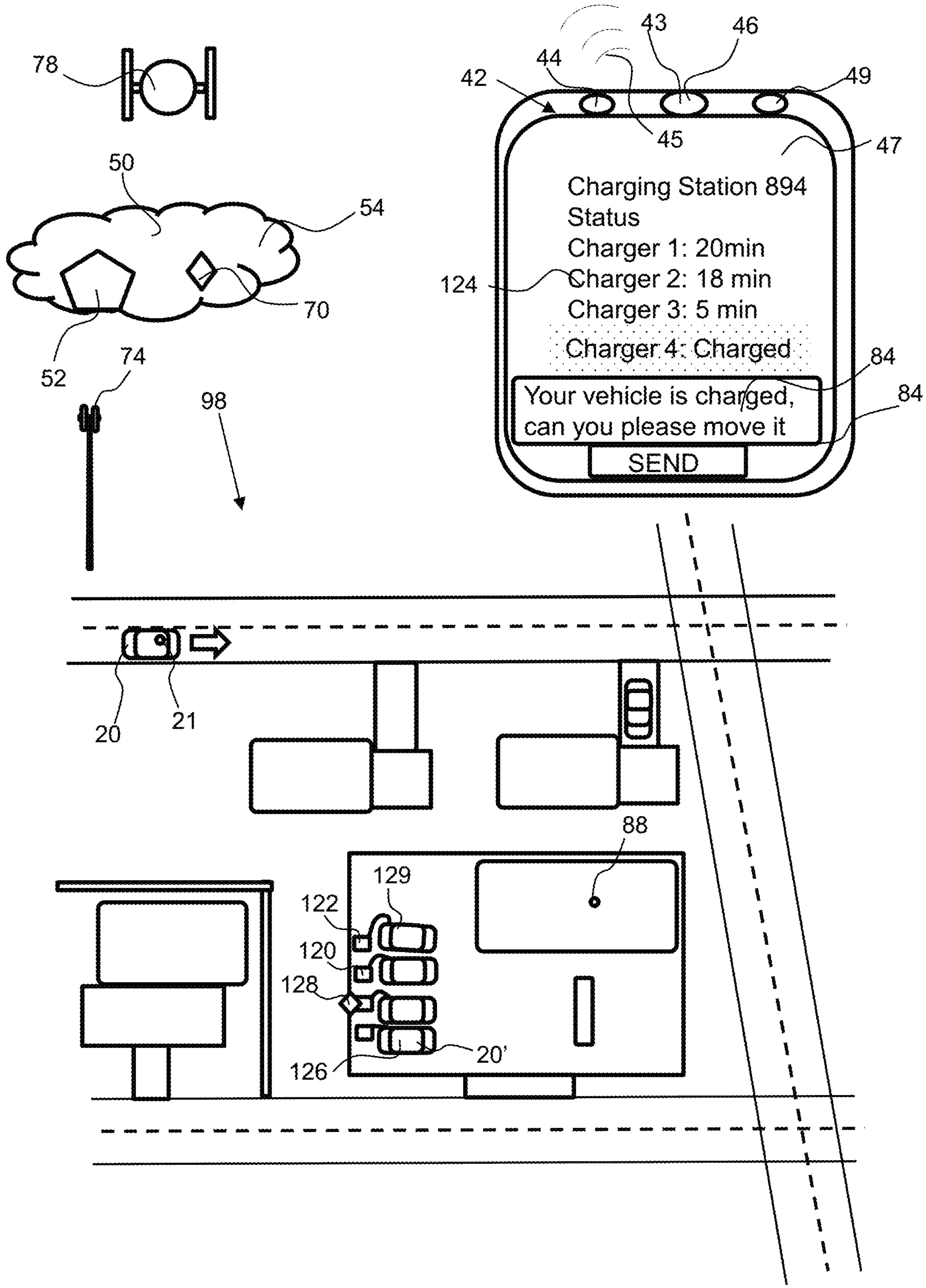
FIG. 9 shows an aerial view of an electric vehicle charging station and a subscriber using their subscriber mobile device to check on the status of individual chargers of the charging station.

As shown in FIG. 9, a vehicle subscriber is using their subscriber mobile device 42 to locate an electric vehicle (EV) charging station 120 and check on the status of individual EV chargers 122 of the EV charging station. As shown on the display 47 (a touch screen display) of the subscriber mobile device 42, the status 124 of each individual charger of the electric vehicle charging station 120 is displayed. A state of charge sensor 129 may be configured to determine the state of charge of the subscribed vehicle and this information may be provided to the anonymous communication system through the system App or from an input sent by the EV charging station 120 or individual EV charger 122. A communicator, vehicle subscriber, subscribed communicator, authorized communicator, can then communicate with a vehicle subscriber of a charging vehicle 126 that is a subscribed vehicle 20. The subscriber vehicle 20 at Charger 4 is fully charged as indicated on the status 124 of charge display and the vehicle subscriber 21 in subscriber vehicle 20 is sending a subscriber message to the driver of subscriber vehicle 20 requesting that they move their vehicle from Charger 4. The subscriber vehicle 20 is driving to the EV charging station 120 as indicated by the bold arrow. Also, an authorized user 88, such as a store owner having an EV charging station on the store premises or an EV charging station manager, that may be remote and send an authorized communicator message to a driver of a subscribed vehicle located at an EV charging station to improve availability of chargers for EV drivers. A store owner may visually monitor an EV charging station and an EV charging station manager may not have visibility of the charging station as they are remote.

Also, an EV charging station 120 may interface with the anonymous system for communicating with a vehicle subscriber 10 through an EV charging station controller 128 and may automatically alert a driver parked at an EV charger of an EV charging station and may alert a driver when their vehicle is fully charged. The EV charging station controller 128 may be integrated with each EV charger at an EV charging station or there may be a separate EV charging station controller 128 at each EV charger 122. When a driver plugs into the charger, they may link with the charger via their subscriber mobile device to confirm that they are plugged in. Also, when the subscriber vehicle is physically plugged in with the EV charger 122, the subscriber vehicle may be linked with the EV charging station controller to log the position at the EV charger and may also download data to the anonymous system for communicating with a vehicle subscriber 10 regarding the status of charge of the subscriber vehicle, time located at or plugged into the EV charger, time remaining to complete charging.

The anonymous system for communicating with a vehicle subscriber may use geolocation to determine that a vehicle subscriber's mobile device or subscribed vehicle is located at an EV charger. The system may determine that the vehicle subscriber or subscribed vehicle has pulled up to an EV charger and the system may send a confirmation notice to the vehicle subscriber for them to confirm that they are now at the EV charger. Also, when a subscriber vehicle that is not an electric vehicle (fully electric powered or plug-in hybrid) parks at an EV charging station, the anonymous system for communicating with a vehicle subscriber may detect this error and may automatically send an authorized message to the subscriber mobile device of the error such as "You have parked in an EV charger parking spot, please move your vehicle." As described herein, the anonymous system for communicating with a vehicle subscriber 10 may require information about the type of vehicle including if the vehicle is an electric or plug in hybrid vehicle. The anonymous system for communicating with a vehicle subscriber 10 may use a geolocation to determine the location of subscriber vehicles at an EV charging station via a geotag within the vehicle. In this way, the subscriber may leave the vehicle during charging with their subscriber mobile device and the location of the vehicle is monitored which may allow a second vehicle subscriber to determine that this first vehicle subscriber is parked at the EV charger.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of a communicator communicating with a vehicle subscriber comprising:

a) providing a subscriber vehicle;

b) providing a system for communicating with a vehicle subscriber of said subscriber vehicle comprising:

i) an interface device of a vehicle subscriber attached to a window of said subscriber vehicle;

wherein the interface device comprises a matrix barcode;

ii) a subscriber mobile device of said vehicle subscriber, said subscriber mobile device comprising:

a wireless communication device;

a subscriber system APP operable on said subscriber mobile device;

iii) a communicator mobile device of said communicator, said communicator mobile device comprising:

an interface device reader that is configured to read the matrix barcode attached to said vehicle;

a wireless communication device;

a communicator system APP operable on said communicator mobile device;

iv) a control system comprising:

a controller;

a database comprising subscriber contact information of said vehicle subscriber and communicator contact information of said communicator;

c) said vehicle subscriber installing said system APP on the subscriber mobile device;

d) said communicator installing said system APP on said communicator mobile device;

e) said communicator using said interface device reader of said communicator mobile device to read the matrix barcode attached to said vehicle;

f) linking the communicator mobile device with the controller of the control system when the interface device reader reads the matrix barcode attached to said subscriber vehicle;

g) said controller opening a communication input via the communicator system APP on said communicator mobile device; and h) said communicator inputting a communicator message via said communication input of the communicator system App;

i) said wireless communication device of the communicator mobile device sending said communicator message to the control system;

j) said control system receiving the communicator message;

k) said control system using geolocation to determine a communicator location of the communicator mobile device when the interface device is used to read the matrix barcode attached to said vehicle;

I) said control system sending said communicator message to said subscriber mobile device of the vehicle subscriber;

m) said subscriber mobile device receiving said communicator message through said system App operating on said subscriber mobile device;

wherein the communicator message is anonymous to the vehicle subscriber;

wherein the vehicle subscriber is anonymous to the communicator;

wherein the system is configured to enable the vehicle subscriber to respond to said communicator message via the subscriber mobile device through the control system and system APP;

wherein the control system uses said geolocation to determine a subscriber vehicle location of the subscriber vehicle; and wherein the control system determines a proximity communicator distance between the communicator location and the subscriber vehicle location and wherein said communicator message is sent only if said proximity communicator distance is below a threshold proximity communicator distance of 100 m.

2. The method of claim 1, wherein the vehicle is an automobile.

3. The method of claim 1, wherein the matrix barcode is a quick response (QR) Code.

4. The method of claim 1, wherein the subscriber mobile device is a mobile phone and wherein the communicator mobile device is a mobile telephone comprising a camera and wherein the interface device reader comprises said camera that reads the matrix barcode by taking a picture of a matrix barcode with said camera.

5. The method of claim 1, wherein the interface device further comprises a short-range communication device.

6. The method of claim 1, wherein the communicator message to the vehicle subscriber includes a text message.

7. The method of claim 1, wherein the communicator mobile device further comprises a camera and wherein the message to the vehicle subscriber from the communicator includes a photo-message including a digital photograph taken with said camera of the communicator mobile device.

8. The method of claim 1, wherein the subscriber mobile device further comprises a speaker and wherein the communicator mobile device further comprises a microphone configured to record a voice message and wherein the communicator message to the vehicle subscriber includes said voice message.

9. The method of claim 8, wherein the communicator message to the vehicle subscriber includes a live phone message.

10. The method of claim 1, wherein the communicator is an authorized communicator and wherein an identity of the authorized communicator is provided to the vehicle subscriber with said communicator message to the vehicle subscriber from the authorized communicator.

11. The method of claim 10, wherein the authorized communicator is a government official.

12. The method of claim 1, wherein the control system identifies subscribed vehicles within a geographical region using geolocation and wherein an authorized communicator sends an authorized message to all subscribed vehicles within said geographical region.

13. The method of claim 1, wherein the subscriber vehicle further comprises a geotag and wherein the control system determines a location of said subscriber vehicle via the geolocation system and said geotag.

14. The method of claim 1, wherein the database includes vehicle identification information of said subscriber vehicle including VIN, license plate number, make and model.

15. The method of claim 14, further comprising a third-party communicator that sends a third-party message to said vehicle subscriber about the vehicle.

16. The method of claim 14, wherein the third-party message includes vehicle registration information.

17. The method of claim 1, wherein the vehicle subscriber inputs an outgoing message to the control system and wherein when said communicator uses said interface device reader of said communicator mobile device to read the matrix barcode attached to said subscriber vehicle, the control system sends said outgoing message to the communicator mobile device.

18. The method of claim 17, wherein the outgoing message includes a vehicle status message.

19. The method of claim 17, wherein the outgoing message includes a location of said vehicle subscriber, wherein said control system uses the geolocation to determine a location of said vehicle subscriber's mobile device when said communicator uses said interface device reader of said communicator mobile device to read the matrix barcode attached to said subscriber vehicle.

20. The method of claim 17, wherein the vehicle subscriber outgoing message includes medical information of the vehicle subscriber.

21. The method of claim 17, wherein the outgoing message includes emergency contact information for the vehicle subscriber.

22. The method of claim 1, wherein the subscriber vehicle further comprises a near field communication device and wherein the communicator mobile device interfaces with the near field communication device to enable said communicator to send a communicator message to said vehicle subscriber.

23. The method of claim 1, further comprising the vehicle subscriber inputting a subscriber response message to said communicator after receiving said communicator message from the communicator.

24. The method of claim 1, wherein the anonymous system for communicating with a vehicle subscriber uses geolocation to determine that a subscriber vehicle is parked at an electric vehicle charging station.

25. The method of claim 24, and wherein the anonymous system for communicating with a vehicle subscriber interfaces with the subscriber vehicle or the electric vehicle charging station to determine a state of charge of said subscriber vehicle.

26. The method of claim 25, wherein a charging status of said subscribed vehicle of said vehicle subscriber parked at the electric vehicle charging station is shown on a display of the second vehicle subscriber mobile device.

27. The method of claim 24, further comprising a second vehicle subscriber and wherein said second vehicle subscriber sends a communicator message to said vehicle subscriber that is parked at said electric vehicle charging station.

* * * * *